United States Patent Office 3,487,147
Patented Dec. 30, 1969

3,487,147
METHOD OF BONDING REFRACTORY GRAINS UTILIZING $CO_2$ GAS
Josef Wuhrer, August-Thyssen-Str. 2,
Wulfrath, Germany
No Drawing. Filed Sept. 13, 1968, Ser. No. 759,784
Claims priority, application Germany, Sept. 13, 1967,
1,646,485
Int. Cl. C04b *15/14, 33/32*
U.S. Cl. 264—82                                3 Claims

ABSTRACT OF THE DISCLOSURE

Fire resistant molded bodies are produced by preparing a mixture of crushed sintered dolomite grains and crushed sintered magnesite grains. The mixture comprises by weight at least 10 to 85 percent sintered magnesite grains and at 15 to 90 percent of sintered dolomite grains. The magnesite content has a grain size of at least 1 mm. and at least 15 percent by weight of the dolomite present has a grain size of not over 1 mm. The mixture of crushed grains is pressed into molded bricks under pressure of at least 400 kg./cm.$^2$ and the bricks are treated with carbon dioxide containing gasses at a temperature of 450 to 800° C. until at least 0.6 percent and preferably more than 1.0 percent by weight of $CO_2$ has been absorbed. The molded bricks are then impregnated with pitch or tar to further increase their air storability and compression strength.

CROSS REFERENCES TO RELATED APPLICATIONS

This application relates to copending application Ser. No. 628,293 filed Apr. 4, 1967 by Friedrich Bischoff and Josef Wuhrer, which generally discloses and claims a process for the production of fire resistant molded bodies from sintered dolomite which has a cold pressure strength of at least 200 kg./cm.$^2$ and a high degree of stability for storage in air. The sinter is crushed for the purpose of achieving new fracture surfaces and is compressed under pressures of at least 400 kg./cm.$^2$ at a suitable grain structure into molded bodies, subsequently being gassed at 450° C. to 800° C. with $CO_2$ or gases containing $CO_2$ up to a $CO_2$ absorption of at least 0.6 percent by weight and then dipped into pitch or tar rich in pitch with a softening point above 40° C. In gassing with $CO_2$, a solid framework of carbonates develops, which considerably increases the cold pressure strength of the pressed object. This cold pressure strength is further increased through subsequent dipping into tar or pitch. Bricks produced by this process do not require a second high temperature firing step because the carbonate framework assures the compression strength up to the beginning of decomposition at about 800° C.

BACKGROUND OF THE INVENTION

The subject matter of the invention is the production of refractory bricks from sintered dolomite.

Refractories, e.g., bricks, blocks, and converter bottoms, prepared by pressing, tamping, vibrating, and the like from burned and subsequently crushed and grain sized dolomite, have a short storage life which is limited to a few days, due to their calcium oxide content. The moisture of the air hydrates the lime which results in disintegration of the shaped bodies. In order to improve the storabiilty, it is known to heat the formed bodies once again at temperatures of 1500° C. and more for an average period of 24 hours, whereby the grains sinter together and a denser surface is obtained which is hydrated only slowly by the moisture of the atmosphere. Such second firing imparts to the bricks also a sufficient compression strength at the ambient temperature. The storability is, on the average, 1 to 2 months; by additional dipping in tar or pitch, it can be increased to 3 or at the most 4 months.

SUMMARY

It is a primary object of the invention to eliminate said second firing and to produce, formed refractory bodies which possess at low temperatures a compression strength of at least 200 kg./cm.$^2$ and good storability in air. The present invention is based on the discovery that only a very small portion of the sintered dolomite grains participate in the forming of the carbonate framework and that a considerable increase in compressive strength can be achieved with very small $CO_2$ absorption values.

The starting materials for the manufacture of the formed bodies comprise a mixture of sintered dolomite grains and sintered magnesite grains. The dolomite grain content of the mixture preferably is 15 to 90 percent and the magnesite grain content preferably is 10 to 85 percent by weight.

It is advantageous to employ the magnesite portion of the mixture in a relatively coarser grain size and the dolomite portion in a relatively finer grain size for the reason that the finer dolomite grains, due to their larger surface, react better with the $CO_2$ gases while forming a solidifying carbonate framework. On the other hand, the sintered magnesite grains do not react with carbonic acid to any appreciable degree in the dry state.

The sintered dolomite portion of the mixture is employed in a grain size below 1 mm. and preferably below 0.5 mm. The sintered dolomite portion may be present in a coarser grain size where relatively small magnesite portions are employed in the mixture, such that the mixture will not contain an excessive amount of fine grain. Where the mixture contains a relatively large portion of sintered magnesite grains the entire amount of sintered dolomite may be present in fine grain sizes below 1 mm. Thus, a suitable mixture consists of 75 percent by weight of sintered magnesite having a grain size of 1–8 mm. and 25 percent by weight of a sintered dolomite having a grain size of 0–1 mm. Likewise, a further suitable mixture consists of 10 percent by weight of magnesite having grain sizes of 5–8 mm. with 90 percent by weight of sintered dolomite having grain sizes of 0–5 mm. In any event, at least 15 percent by weight of the dolomite present in the mixture have a grain size below 1 mm. It was contemplated to employ mixtures wherein the grain bands of the component dolomite and magnesite portions overlap. Thus, mixtures can be employed wherein the grain sizes of the magnesite portion are 2–8 mm. and the grain sizes of the dolomite portion are 0.3–5 mm.

In order to ensure the $CO_2$ absorption in the gassing operation at a sufficient rate, it is of advantage to break sintered dolomite and magnesite so as to produce fresh fractures. Prior to pressing, the broken material is classified, and a suitable mixture is blended from the sized grains. Said mixture is then compacted to form bodies, preferably by pressing. The compacting can be, of course, prepared and improved by previous vibrating and/or tamping. Subsequently, the gassing of the formed bodies can be carried out continuously in a conventional tunnel or tempering oven or discontinuously in individual gassing chambers. Pure carbon dioxide, or dry waste gases containing carbon dioxide, may be employed. When, in the use of waste gases, the gassing is carried out at temperatures above the hydration temperature of the CaO, drying of said gases is not absolutely necessary. The formed bodies should be allowed to cool in a moisture-free atmosphere, which should preferably contain $CO_2$. The times and temperatures for the gassing operation depend on the composition of the starting materials and on the $CO_2$ content of the gases. The required minimum temperatures are readily determined by a preliminary test for any special mixture, taking into account that a minimum amount of 0.6 percent by weight of $CO_2$, calculated on the dolomite portion, must be absorbed.

The gassing temperatures employed are in the range of 450–800° C. However, if gassing is performed with the application of pressure, the gassing temperatures may be lowered and the time for absorption of a specified $CO_2$ content may be lessened.

An increased $CO_2$ content increases the storability in air and the low temperature compression strength. Absorption of more than 0.6 percent, and preferably more than 1 percent by weight of $CO_2$ calculated on the sintered dolomite, produces a considerable improvement of said properties.

The various burned dolomite types can be defined by their weight per liter. For instance, at a grain size of 5–12 mm. the weight per liter of soft burned dolomite is about 800–1000 g./l. that of medium burned dolomite is about 1000–1250 g./l.; hard-burned dolomite has a weight of about 1250–1500 g./l. and sintered dolomite at least 1500 g./l., frequently more than 1600 g./l. and sometimes even more than 1700 g./liter.

The refractory shapes obtained after gassing have frequently already an increased low temperature compression strength and sufficient storability in air. However, said properties are considerably improved by subsequent dipping in tar, pitch-containing tar, or pitch, or similar organic products whereby the refractory art does not make any distinction between petroleum base and coal base materials. It is only necessary that the softening point of said substances is above 40° C. For the dipping operation, they are, therefore, liquefied by heating; said operation may be also carried out under reduced pressure.

A higher portion of pitch in the dipping tar can be employed to increase the compressive strength and carbon content of the refractory brick.

Chromium magnesite may be employed in place of magnesite in the present process to produce the improved MgO-containing fire resistant bricks having increased compressive strength without the necessity of employing the conventional second burning. Fire resistant bricks made according to the present process are further characterized in that components such as phosphates, sulfates and chlorides, normally present in the prior chemically bonded magnesite bricks when produced without a second calcination are not present to impair their characteristics.

Typical practice of the invention is exemplified in the following examples in which the details are given by way of illustration, and are not to be construed as limiting the invention.

EXAMPLE 1

Sintered dolomite of a grain size of 5 to 12 mm. and a bulk density of 1720 g./liter was crushed to a grain mixture consisting of 50 percent each of the sizes 0.0 to 0.3 mm. and 0.3–1.5 mm. Sintered magnesite was crushed to a grain size of 1 to 8 mm., consisting of a mixture of equal parts by weight, of grain sizes 1.0 to 3.0 mm., 3.0 to 5.0 mm. and 5.0 to 8.0 mm. A blend of 75 percent by weight of magnesite grain mixture and 25 percent of the dolomite grain mixture was pressed under a pressure of 800 kg./cm.² to formed bodies of conventional brick shape. The compression strength of said bricks was 15 kg./cm.². Subsequently, the bricks were heated for one hour in a carbon dioxide atmosphere at 600–650° C. The $CO_2$ absorption was 0.7% by weight. The low temperature compression strength of the bricks was 68 kg./cm.². The bricks were then dipped into soft pitch (softening point 50° C.) having a temperature of 150° C. The thus obtained bricks had a low temperature compression strength of 430 kg./cm.², and they were storable in air for more than 6 months.

EXAMPLE 2

Sintered dolomite of a grain size and a bulk density according to Example 1 was crushed to a grain mixture consisting of 50 percent each of the sizes 0.3 to 1.5 mm. and 1.5 to 3 mm. Sintered magnesite was crushed to a grain size of 5 to 8 mm. A blend of 70 percent by weight of magnesite grain mixture and 90 percent of the dolomite grain mixture was pressed to bricks at a pressure of 1200 kg./cm.². The strength of the bricks was 20 kg./cm.². Subsequently, they were heated for 5 hours at 550–600° C. in a gas mixture which contained 30 percent $CO_2$. After cooling, the $CO_2$ absorption was 1.4 percent by weight, and the low temperature compression strength of the gassed bricks was 120 kg./cm.². The bricks were then dipped in steel work tar having a softening point of 80° C. This treatment increased the low temperature compression strength to 560 kg./cm.², and the storability in air was more than 8 months.

I claim:
1. A method of preparing refractories having a low temperature compression strength of at least 200 kg./cm.² and good storability which comprises
    (a) preparing a mixture comprising from 15 to 90 percent by weight of crushed sintered dolomite grains and 10 to 85 percent by weight of crushed sintered magnesite grains, at least 15 percent by weight of the crushed sintered dolomite present having a grain size below 1 mm. in diameter,
    (b) pressing said mixture into shapes under a pressure of at least 400 kg./cm.².
    (c) treating said shapes with carbon dioxide at a temperature of 450 to 800° C. until said shapes have absorbed at least 0.6 percent by weight of carbon dioxide,
    (d) cooling said shapes, and
    (e) dipping said shapes into a member of the group consisting of tar, pitch-containing tar and pitch having a softening point above 40° C.

2. The method of claim 1 wherein at least 15 percent by weight of the crushed sintered dolomite present has a grain size below 0.5 mm. in diameter.

3. The method of claim 1 wherein the crushed sintered magnesite present has a grain size in the range of 1 to 8 mm.

References Cited

UNITED STATES PATENTS

| | | | |
|---|---|---|---|
| 2,536,073 | 1/1951 | McGarvey | 264—82 |
| 2,547,323 | 4/1951 | Heuer | 106—59 |
| 2,616,150 | 11/1952 | Vettel | 106—61 |
| 2,639,993 | 5/1953 | Heuer | 264—56 |
| 2,656,279 | 10/1953 | Heuer | 106—58 |
| 3,108,860 | 10/1963 | Davies et al. | 264—65 |
| 3,329,515 | 7/1967 | Leopold | 264—82 |

JULIUS FROME, Primary Examiner

JOHN H. MILLER, Assistant Examiner

U.S. Cl. X.R.

264—56, 65; 106—58, 61